Patented Aug. 21, 1934

1,971,172

UNITED STATES PATENT OFFICE 1,971,172

TREATMENT OF HYDROCARBON OILS

Wayne L. Benedict, Chicago, Ill., assignor to Universal Oil Products Company, Chicago, Ill., a corporation of Delaware No Drawing. Application November 18, 1932,
Serial No. 643,291

2 Claims. (Cl. 196—29)

This invention refers more particularly to the treatment of low boiling distillates produced in the cracking of the heavier portions of crude petroleums, (both distillates and residuums) though similar distillates produced in cracking other heavy hydrocarbon materials such as coal tars, etc., may also be treated. With suitable modifications of the conditions of operation, the process may also be applied to the treatment of hydrocarbon mixtures which are normally gaseous at ordinary temperatures and pressures.

In a more specific sense the invention has reference to a process of treatment in which the vapors of cracked distillates are treated for the removal of sulphur compounds, particularly hydrogen sulphide and to some extent mercaptans and other sulphur-containing compounds, the advantages to be gained by such a treatment being obvious to those skilled in the art of petroleum refining since the presence of sulphur in the vapors either as hydrogen sulphide or in organic combination frequently renders ineffective subsequent vapor-phase treating steps, particularly steps involving the use of metallic catalysts which are all more or less readily poisoned by sulphur.

In the production of refined and stable gasolines from the raw naphtha distillates produced in cracking operations, the customary mode of procedure in most cases still embodies the following general steps: (1) liquid-phase treatment of distillate with regulated quantities of sulphuric acid (2) neutralization and sweetening (3) redistillation to produce an overhead gasoline of some desired end point, heavy polymers and other reaction products of the acid treatment being left behind in the reflux from the distillation. One disadvantage in this series of operations lies in the lack of selectivity of sulphuric acid in removing only the unstable di and tri-olefins without affecting the more stable mono-olefins, the need for prohibitive quantities of acid to effect the necessary sulphur reductions in many instances, and the expense of redistillation. Thus many processes, both of liquid and vapor-phase, have been developed to selectively polymerize the gum-forming olefins and the sulphur compounds involving either one-stage or multi-stage treatments. Among treatments for effecting the removal of readily polymerizable olefins the use of fuller's earth and other absorbents, the use of aluminum and zinc chlorides and other metal halides and the use of oxidizing gases sometimes, in the presence of special catalytic materials, may be mentioned. To effect sulphur reduction concentrated acid has been employed at low temperatures in liquid-phase treatments (at which temperatures its oxidation and polymerizing tendencies are lessened) and vapor-phase processes employing sulphuric acid diluted by non-volatile salts rather than by water have been employed, the reagent solutions being usually flowed by gravity counter-current to ascending vapor mixtures. In many vapor-phase treatments, particularly those involving metals and metal salts and in treatments employing hydrogen and metallic catalysts, the presence of even small amounts of sulphur is definitely detrimental on account of the rapid loss of catalytic efficiency, which can usually be traced to the effect of hydrogen sulphide rather than to the effect of other sulphur compounds upon the sensitive catalysts.

The present invention has for its primary object the provision of a process for removing hydrogen sulphide from cracked vapors, prior to the application of vapor-phase treatments aimed at the controllable elimination of gum-forming constituents either by polymerization or by hydrogenating them to saturated compounds. However, the process possesses further advantages in the removal of combined sulphur and thus in many cases obviating the necessity for special treatments for accomplishing this end.

In one specific embodiment the invention comprises treatment of sulphur-containing hydrocarbon vapors, particularly the vapors of approximate gasoline boiling range from cracking processes with oxygen and ammonia while in contact with adsorbent or activated carbon.

The effect of this treatment is not predictable on a basis of ordinary chemical reactions, since the amount of ammonia which is necessary is very small, and it acts rather in a catalytic than in a chemical sense. Apparently the basic reaction involved is given by the following equation in reference to the oxidation of hydrogen sulphide:

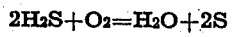

$$2H_2S + O_2 = H_2O + 2S$$

Since experiments have shown that more sulphur is removed than corresponds exactly to the hydrogen sulphide present, the above equation may be assumed to typify a series of reactions involving, in addition to hydrogen sulphide, both mercaptans and organic sulphides in which either one or two of the hydrogen atoms in sulphide are replaced by alkyl residues. For the production of the desulphurizing reactions to the desired extent and at an economic rate at the temperature of cracked vapors some excess of oxygen whether added as the pure gas or in air is necessary, and it was found that frequently the use of this excess of oxygen resulted in undesirable oxidation of the hydrocarbons themselves and high losses of material. It was then found that by using relatively small amounts of ammonia along with the oxygen that much less of the latter was required and the reactions proceeded at a much more rapid rate. It might be assumed that the reactions in the presence of ammonia would be expressed by the following equations:

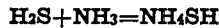

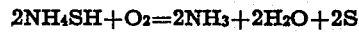

According to this scheme of reactions the ammonia definitely enters into the reactions and is completely regenerated so that a small amount is all that is necessary to effect complete transformation of the sulphur compounds to free sulphur. The role of the adsorbent carbon consists in assisting in catalyzing the reactions and in removing the liberated sulphur from the sphere of the reaction insofar as its adsorptive capacity permits.

In order to restore the adsorptive properties of the carbon, the sulphur may be dissolved therefrom by use of aqueous solutions containing both ammonium sulphide and ammonia which dissolve the adsorbed sulphur to form ammonium polysulphides. After this extraction the carbon is then steamed to volatilize any adsorbed compounds of ammonium and sulphur and is then ready for further use. In applying the process of the invention to the treatment of sulphur-containing cracked vapors, they are first mixed with a small quantity of air, the exact amount employed depending upon the amount of hydrogen sulphide and other sulphur compounds present, though it may be stated that 50 to 60 cubic feet of air per barrel of finished gasoline represents the approximate maximum quantity necessary, this corresponding to a weight of ½ of 1% hydrogen sulphide in the vapor mixture. A small amount of ammonia is also introduced, the amount necessary being ordinarily less than 1/20 of the quantity of air. This small amount is sufficient to catalyze the rate of the reactions so that excess of oxygen is unnecessary and the reactions may be brought about at the normal temperature of the cracked vapors.

The mixture of cracked vapors, air and ammonia is then preferably passed through a stationary bed of adsorbent carbon which, for a time, both assists in catalyzing the reactions and absorbs the free sulphur produced. Obviously the efficiency of this step will depend upon the degree of activity of the carbon and it is evidently advantageous to employ types of carbon generally classified as the "activated" variety. The size of the particles is a matter of some consideration and the particular range of particle size chosen will depend to some extent upon the physical properties and structure of the carbon employed and its resistance to disintegrating influences. When using activated carbons of sufficiently tough structure a 20 to 60 mesh grade, corresponding in particle size to the fuller's earth used in percolation and vapor-phase treatments may be effectively utilized. The treating chambers in which the carbon may be supported upon a screen of copper mesh are preferably well insulated to prevent undue condensation of heavier constituents of the vapors and may be externally heated, if desired, to maintain the requisite treating temperatures. Ordinarily, however, temperatures normal to cracked gasoline vapors under 50 to 100 pounds pressure, say from 250 to 400° F., are sufficiently high for effecting the reactions of treatment.

After passage of the vapor mixture through the bed of contact and adsorbent material they may be passed to a fractionator, serving for the production of an overhead gasoline of the desired end point and refluxes which are returned to the cracking plant for further conversion or otherwise disposed of.

The process may be operated continuously by employing the carbon-containing treating chambers in parallel arrangement so that one may be in use for effecting the reactions of the treatment while the carbon in others is being regenerated by dissolving of the adsorbed sulphur and subsequent steaming.

As an example of the results obtainable by the employment of the process in treating cracked vapors for sulphur removal, the following may be cited. The naphtha vapors from a cracking plant operating upon a mixture of West Texas and Mid-Continent residua may be mixed with air in an amount equivalent to about 60 cubic feet per barrel of finished gasoline from the treatment and receive also a small increment of ammonia gas. The vapors thus augmented by additions of air and ammonia may then be passed through a bed of 30 to 60 mesh activated carbon at a temperature of approximately 375° F., and at a pressure of 75 pounds per square inch, the flow through the carbon being in a downward direction. The vapors from this treatment may then be passed to a fractionator operating under substantially the same pressure and a gasoline of 400 end point produced.

The following table admits a comparison of the properties of the gasoline produced from the vapors as the result of treatment and an unrefined gasoline produced by simple fractionation without the use of the present process or any other vapor-phase treatment.

|  | Untreated | Treated |
| --- | --- | --- |
| Gravity °A. P. I. | 53.2 | 53.5 |
| End point °F. | 405 | 400 |
| Color Saybolt. | 20 | 30 |
| Color after 4 hours exposure to sunlight | Yellow. | 25 |
| Mg. gum by copper dish | 275 | 25 |
| Total sulphur % | 0.35 | 0.05 |

The fixed gases separated from the gasoline in the final receiver may be substantially free from hydrogen sulphide which is an additional benefit in connection with the production of a gasoline of the refined character shown above.

The foregoing specification and example have shown the general character of the invention and exemplified the results obtainable by its practical application but neither is to be construed as imposing undue limitations upon the scope of the invention.

I claim as my invention:

1. A process for the treatment of normally liquid hydrocarbon oil containing mercaptans and organic sulphides to remove sulphur compounds therefrom, which comprises subjecting the said hydrocarbon oil while in heated vaporous condition and at a temperature above 250° F. to the action of a gas containing oxygen and ammonia while in contact with a catalyst comprising activated carbon.

2. A process for the treatment of normally liquid hydrocarbon oil containing mercaptans and organic sulphides to remove sulphur compounds therefrom, which comprises subjecting the said hydrocarbon oil while in heated vaporous condition and at a temperature above 250° F. to the action of air and ammonia while in contact with a catalyst comprising activated carbon.

WAYNE L. BENEDICT.